United States Patent [19]
Yamaguchi

[11] Patent Number: 5,530,687
[45] Date of Patent: Jun. 25, 1996

[54] DISK-TYPE RECORDING MEDIUM DRIVE AND METHOD OF SELF-DIAGNOSING DISK-TYPE RECORDING MEDIUM DRIVE

[75] Inventor: Takao Yamaguchi, Kanagawa, Japan

[73] Assignee: Sony Corporation, Tokyo, Japan

[21] Appl. No.: 238,240

[22] Filed: May 4, 1994

[30]   Foreign Application Priority Data

May 6, 1993 [JP] Japan .................................... 5-105560

[51] Int. Cl.$^6$ ....................................................... G11B 7/00
[52] U.S. Cl. .................... 369/54; 369/58; 369/47
[58] Field of Search .................................. 369/54, 53, 58, 369/59, 47, 48, 49, 44.32, 44.25

[56]   References Cited

U.S. PATENT DOCUMENTS

| | | | |
|---|---|---|---|
| 4,969,139 | 11/1990 | Azumatani et al. | 369/58 X |
| 5,185,733 | 2/1993 | Finkelstein et al. | 369/58 X |
| 5,392,269 | 2/1995 | Horie | 369/54 |

Primary Examiner—Georgia Y. Epps
Assistant Examiner—Muhammad N. Edun
Attorney, Agent, or Firm—Limbach & Limbach; Philip M. Shaw, Jr.

[57]   ABSTRACT

A device for driving the disk-type recording medium, such as a magnetooptical disk, has a read and write system for reading data from and writing data on the disk-type recording medium. The read and write system is self-diagnosed by generating time data which vary with time after the device is turned on, and detecting when the disk-type recording medium is loaded into the device, generating test data depending on the time data at the time the disk-type recording medium is loaded as detected, writing the test data in a predetermined area on the disk-type recording medium with the read and write system, reading the written test data from the predetermined area on the disk-type recording medium with the read and write system, and determining whether the test data read from the disk-type recording medium agree with the generated test data.

10 Claims, 2 Drawing Sheets

DISK-TYPE RECORDING MEDIUM DRIVE AND METHOD OF SELF-DIAGNOSING DISK-TYPE RECORDING MEDIUM DRIVE

BACKGROUND OF THE INVENTION

1. Field of the Invention

The present invention relates to a disk-type recording medium drive for driving a disk-type recording medium such as a magnetooptical disk and a method of self-diagnosing such a disk-type recording medium drive.

2. Description of the Prior Art

Conventional apparatus for driving disk-type recording mediums such as magnetooptical disk drives carry out a self-diagnosis when a magnetooptical disk is loaded. In the self-diagnosis, the magnetooptical disk drive automatically writes test data in a test area radially inward of a recording surface on the magnetooptical disk, reads the written test data, and compares the read test data with the test data to determine whether the recording and reproducing system including an optical pickup, etc. is operating normally.

The above self-diagnosis process will be described in specific detail below. Desired data are recorded on and read from a magnetooptical disk sector by sector by a magnetooptical disk drive. In the magnetooptical disk drive, one sector on the magnetooptical disk is composed of 512 bytes.

The test data are determined in advance by a program executed by a microprocessor unit (MPU) of the magnetooptical disk drive. Specifically, the test data are 512 bytes or a sector of data comprising two repeated sets of 256 bytes of data 00h, 01h, . . . , FFh.

The test data are written in the test area of the magnetooptical disk which is capable of recording one sector of data.

The magnetooptical disk drive can rewrite data that are written in the magnetooptical disk by erasing the written data and then writing new data on the magnetooptical disk. More specifically, to erase the written data from an area of the magnetooptical disk, a magnetic field is applied in one direction to the magnetooptical disk, and a data erasing laser beam of strong laser power is also applied to the area of the magnetooptical disk. The area of the magnetooptical disk is now magnetized in one direction, thus erasing any written data from the area. Thereafter, the applied magnetic field is reversed, and a data writing laser beam of strong laser power is applied to the area of the magnetooptical disk. The written data can be read from the magnetooptical disk by accessing the magnetooptical disk with a laser beam of weak laser power.

Therefore, for recording test data in the test area, it is necessary to erase the test data which have previously been written and then write the new test data in the test area.

The conventional magnetooptical disk drive uses the same test data in every cycle of the self-diagnosis. Consequently, even if the laser power applied for erasing and writing the test data is too low to erase the previous test data and write the present test data due to a failure of the recording and reproducing system, the magnetooptical disk drive may read the test data which have previously been written in the test area, and may determine that the recording and reproducing system is operating normally.

OBJECTS AND SUMMARY OF THE INVENTION

It is therefore an object of the present invention to provide a disk-type recording medium drive capable of reliably self-diagnosing a recording and reproducing system thereof, and a method of self-diagnosing a disk-type recording medium drive.

According to the present invention, there is provided a device for driving a disk-type recording medium, comprising read and write means for reading data from and writing data on a disk-type recording medium, switch means for switching the device into and out of operation, timer means for detecting a period of time which has elapsed after the device has been switched into operation by the switch means, detecting means for detecting when the disk-type recording medium is loaded into the device, and control means for generating test data determined by an output signal from the timer means at the time the disk-type recording medium is loaded as detected by the detecting means, controlling the read and write means to write the test data on the disk-type recording medium and then read the test data from the disk-type recording medium, and determining whether the test data read from the disk-type recording medium agree with the generated test data for self-diagnosing the read and write means.

According to the present invention, there is also provided a device for driving a disk-type recording medium, comprising read and write means for reading data from and writing data on a disk-type recording medium, time data generating means for generating time data which vary with time, and control means for generating test data determined by the time data, controlling the read and write means to write the test data on the disk-type recording medium and then read the test data from the disk-type recording medium, and determining whether the test data read from the disk-type recording medium agree with the generated test data for self-diagnosing the read and write means.

According to the present invention, there is further provided a method of self-diagnosing a read and write system for reading data from and writing data on a disk-type recording medium in a device for driving the disk-type recording medium, comprising the steps of (a) generating time data which vary with time after the device is turned on, (b) detecting when the disk-type recording medium is loaded into the device, (c) generating test data as a function of the time data at the time the disk-type recording medium is loaded as detected in the step (b), (d) writing the test data in a predetermined area on the disk-type recording medium with the read and write system, (e) reading the written test data from the predetermined area on the disk-type recording medium with the read and write system, and (f) determining whether the test data read from the disk-type recording medium in the step (e) agree with the test data generated in the step (c).

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 2:
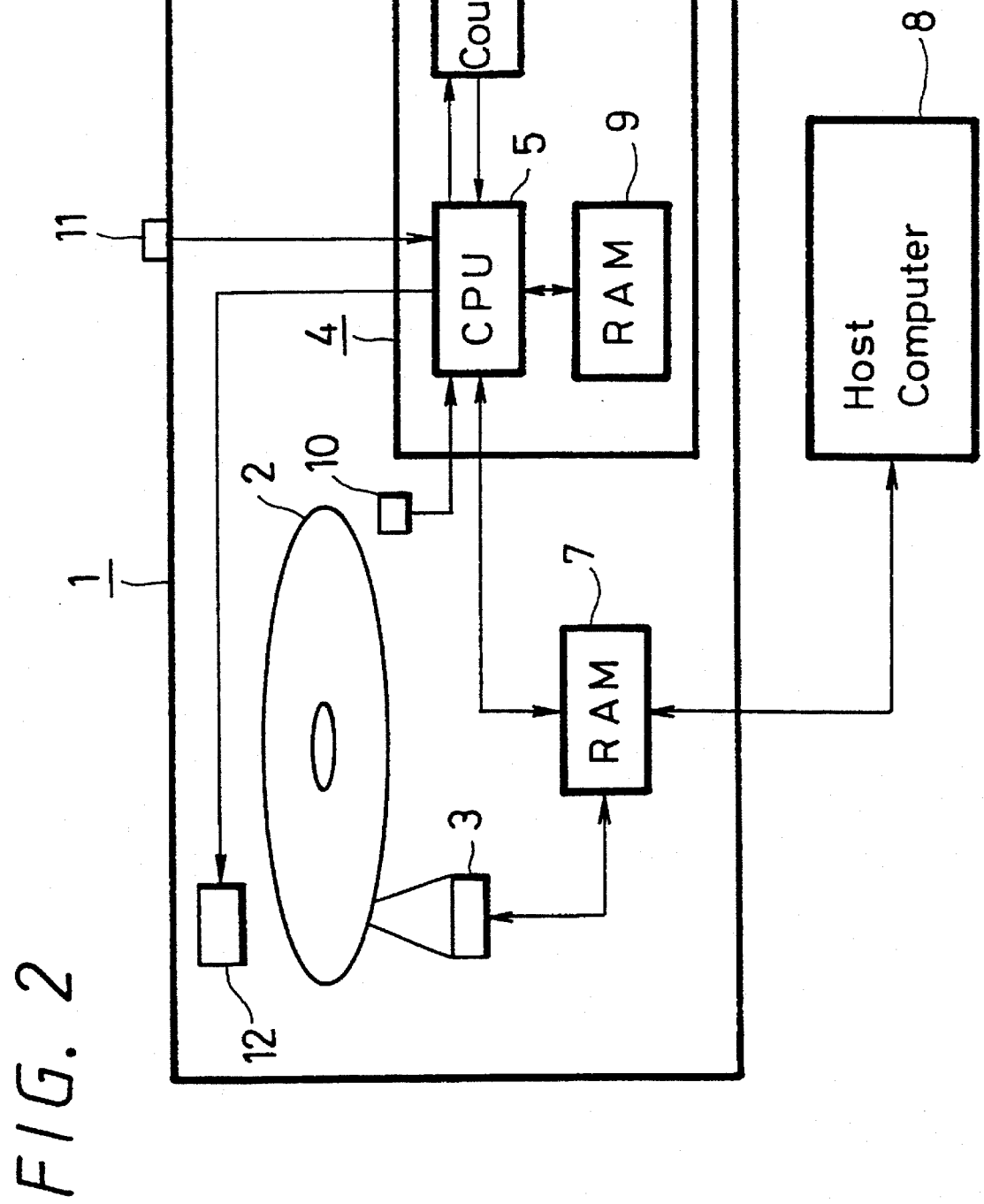
FIG. 2 is a block diagram of a magnetooptical disk drive according to the present invention.

As shown in FIG. 2, a magnetooptical disk drive, which is generally designated by the reference numeral 1, according to the present invention includes an optical pickup 3 for erasing data from, writing data on, and reading data from a magnetooptical disk 2, and a magnetic field generator 12 for applying a magnetic field to the magnetooptical disk 2 in erasing data from and writing data on the magnetooptical disk 2.

The magnetooptical disk drive 1 also has an MPU 4 comprising a central processing unit (CPU) 5, a counter 6 which is started when the power supply of the magnetooptical disk drive 1 is turned on, a random-access memory (RAM) 9, a read-only memory (ROM) (not shown), and an input/output (I/O) device (not shown). The counter 6 can cyclically output a succession of 256 values 00h, 01h, ..., FFh. The count of the counter 6 is incremented every 10 msec. Therefore, the counter functions as a timer.

Data from the CPU 5 are written in a buffer RAM 7. The data read from the buffer RAM 7 are supplied to the optical pickup 3, which then writes the supplied data on the magnetooptical disk 2. Data read from the magnetooptical disk 2 by the optical pickup 3 are written in the buffer RAM 7, from which they are read and supplied to the CPU 5.

Data and commands from an external host computer 8 are written in the buffer RAM 7, from which they are read and supplied to the optical head 3 and the CPU 5. Data read from the magnetooptical disk 2 by the optical pickup 3 are written in the buffer RAM 7, from which they are read and supplied to the CPU 5 or the host computer 8.

Figure 1:
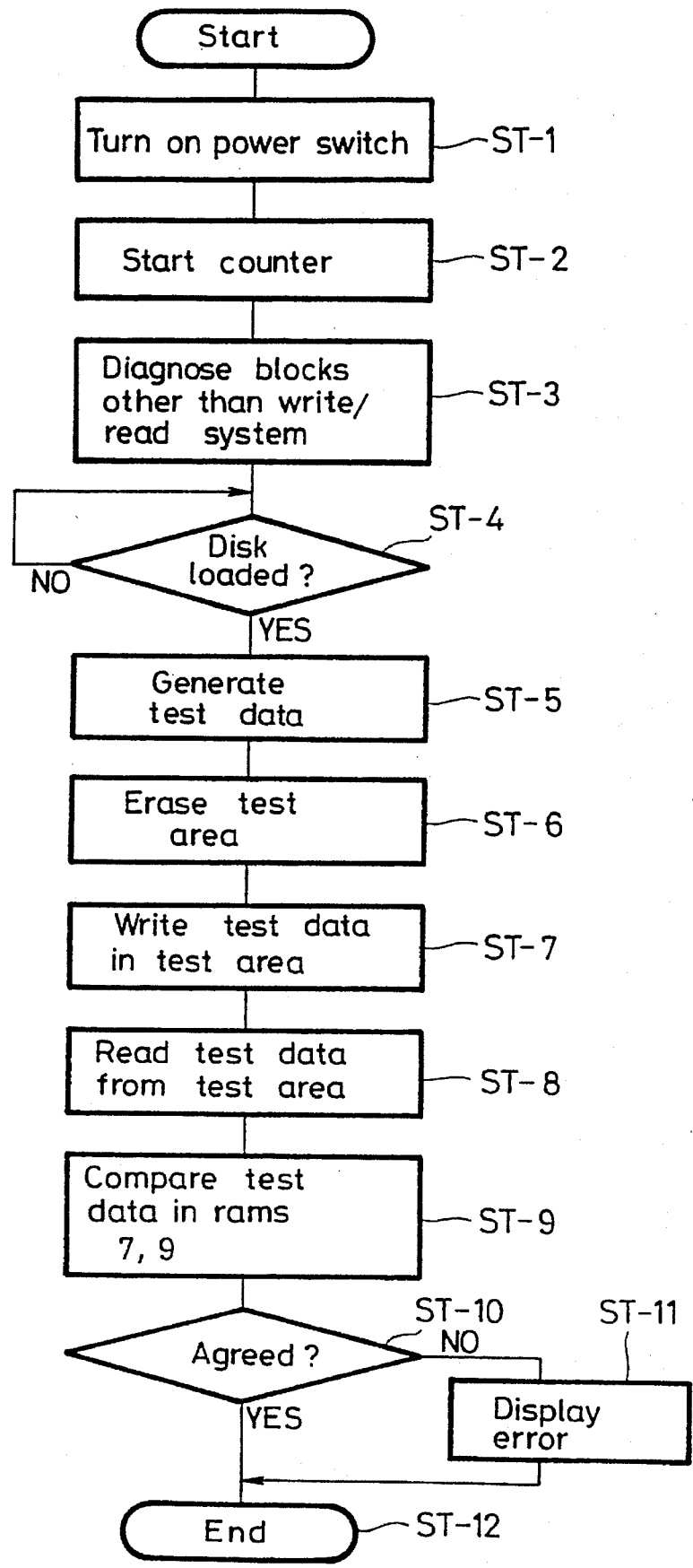
FIG. 1 is a flowchart of a self-diagnosing process for self-diagnosing a magnetooptical disk drive according to the present invention.

A self-diagnosing process for self-diagnosing the magnetooptical disk drive 1 according to the present invention will be described below with reference to FIG. 1.

The power supply of the magnetooptical disk drive 1 is turned on by a power supply switch 11 in a step ST-1. Then, the CPU 5 starts the counter 6 in a step ST-2, and self-diagnoses blocks other than a recording and reproducing system or a write/read system, e.g., the RAMs 7, 9, the ROM, etc. in a step ST-3. Thereafter, the CPU 5 determines in a step ST-4 whether the magnetooptical disk 2 is loaded in the magnetooptical disk drive 1 or not based on a signal from a detector switch 10. If the magnetooptical disk 2 is loaded in the magnetooptical disk drive 1, then control proceeds to a step ST-5 in which the CPU 5 generates test data based on the count data of the counter 6 at the present time.

If the count data are "01 h", then the test data are composed of two repeated sets of values 01 h, 02 h, 03 h, ..., FFh, 00 h. If the count data are "02 h", then the test data are composed of two repeated sets of values 02 h, 03 h, 04 h, ..., FFh, 01 h.

The test data generated by the CPU 5 are transferred to and written in the buffer RAM 7 and also written in the RAM 9 of the MPU 4.

Then, the CPU 5 erases the content of the test area of the magnetooptical disk 2 in a step ST-6.

The CPU 5 reads the test data from the buffer RAM 7, supplies the read test data to the optical pickup 3, and writes the test data in the test area of the magnetooptical disk 2 in a step ST-7.

The CPU 5 then reads the test data from the test area of the magnetooptical disk 2 through the optical pickup 3, and writes the read test data in the buffer RAM 7 in a step ST-8.

In a next step ST-9, the CPU 5 compares the test data written in the buffer RAM 7 with the test data written in the RAM 9.

If the compared test data agree with each other in a step ST-10, then control proceeds to a step ST-12 in which the self-diagnosing process is ended. If the compared test data do not agree with each other in the step ST-10, then since the recording and reproducing system is suffering a failure, control goes to a step ST-11 in which the failure is displayed on a display unit connected to the host computer 8. Thereafter, the self-diagnosing process is brought to an end in the step ST-12.

In the above self-diagnosing process, the CPU 5 employs the test data depending on the count data of the counter 6 at the time the magnetooptical disk 2 is loaded in the magnetooptical disk drive 1. Therefore, inasmuch as the time that is consumed after the power supply is turned on until the magnetooptical disk 2 is loaded varies each time the magnetooptical disk drive 1 operates, the test data also vary each time the self-diagnosing process is carried out. Accordingly, the magnetooptical disk drive 1 can be self-diagnosed reliably.

While the magnetooptical disk drive 1 is self-diagnosed immediately after the magnetooptical disk 2 is loaded in the magnetooptical disk drive 1 in the illustrated embodiment, the magnetooptical disk drive 1 may be self-diagnosed at periodic intervals at times rather than immediately after the magnetooptical disk 2 is loaded.

The principles of the present invention are also applicable to disk drives for magnetic disks or similar disk-type recording mediums rather than magnetooptical disks.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. An apparatus for driving a disk-type recording medium, comprising:

read and write means for reading data from and writing data on a disk-type recording medium;

switch means for switching the apparatus into and out of operation;

timer means for detecting a period of time which has elapsed after the apparatus has been switched into operation by the switch means;

detecting means for detecting when the disk-type recording medium is loaded into the apparatus; and control means for generating test data determined by an output signal from the timer means at the time the disk-type recording medium is loaded as detected by the detecting means, controlling the read and write means to write the test data on the disk-type recording medium, and determining whether the test data read from the disk-type recording medium agree with the generated test data for self-diagnosing the read and write means.

2. A device according to claim 1, wherein the control means control the read and write means to erase existing written test data from the disk-type recording medium and thereafter write new test data on the disk-type recording medium.

3. An apparatus according to claim 2, wherein the control means comprises means for controlling the read and write means to write the new test data on the disk-type recording medium in an area from which the existing written test data have been erased.

4. An apparatus for driving a disk-type recording medium, comprising:

read and write means for reading data from and writing data on a disk-type recording medium;

time data generating means for generating time data which vary with time; and control means for generating test data determined by the time data, controlling the read and write means to write the data on the disk-type recording medium and then read the test data from the disk-type recording medium, and determining whether the test data read from the disk-type recording medium agree with the generated test data for self-diagnosing the read and write means.

5. An apparatus according to claim 4, wherein the control means comprises means for controlling the read and write means to erase existing written test data from the disk-type recording medium and thereafter write new test data on the disk-type recording medium.

6. A device according to claim 5, wherein the control means control the read and write means to write the new data on the disk-type recording medium in an area from which the existing written test data have been erased.

7. A method of self-diagnosing a read and write system for reading data from and writing data on a disk-type recording medium in an apparatus for driving the disk-type recording medium, comprising the steps of:

(a) generating time data which vary with time after the apparatus is turned on;

(b) detecting when the disk-type recording medium is loaded in to the device;

(c) generating test data as a function of the time data at the time the disk-type recording medium is loaded as detected in the step (b);

(d) writing the test data in a predetermined area on the disk-type recording medium with the read and write system;

(e) reading the written test data from the predetermined area on the disk-type recording medium with the read and write system; and (f) determining whether the test data read from the disk-type recording medium in the step (e) agree with the test data generated in step (c).

8. A method according to claim 7, further comprising the step of:

(g) erasing existing test data from the disk-type recording medium prior to the step (d).

9. A method according to claim 7, further comprising the step of:

(h) displaying an error if the read test data do not agree with the generated test data in the step (f).

10. A recording and reproducing apparatus for a disk-type recording medium having a test area, comprising:

read and write means for reading data from and writing data on the disk-type recording medium;

means for randomly generating test data, wherein the means for randomly generating test data includes:

time data generating means for generating time data which vary with time elapsed from a detected event; and means for generating test data determined by the time data;

storing means for storing the randomly generated test data; and control means for controlling the read and write means to erase the test area and write the randomly generated test data in the test area, reproducing the randomly generated test data from the test area, and determining whether the randomly generated test data read from the test area agree with the randomly generated test data stored by the storing means for self-diagnosing the read and write means.

* * * * *